United States Patent
Duligall et al.

(10) Patent No.: US 8,774,638 B2
(45) Date of Patent: Jul. 8, 2014

(54) PHOTONIC QUANTUM SYSTEM ALIGNMENT USING MULTIPLE BEAMS

(75) Inventors: Joanna Duligall, Gloucester (GB); Timothy Spiller, Bristol (GB); Radu Ionicioiu, Bristol (GB); Raymond G. Beausoleil, Redmond, WA (US); David A. Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 13/260,095

(22) PCT Filed: Jul. 31, 2009

(86) PCT No.: PCT/US2009/052394
§ 371 (c)(1),
(2), (4) Date: Oct. 21, 2011

(87) PCT Pub. No.: WO2011/014184
PCT Pub. Date: Feb. 3, 2011

(65) Prior Publication Data
US 2012/0039617 A1    Feb. 16, 2012

(51) Int. Cl.
*H04B 10/00*    (2013.01)

(52) U.S. Cl.
USPC ........... 398/129; 398/127; 398/128; 398/130; 398/131; 398/152; 398/156; 380/255; 380/33

(58) Field of Classification Search
CPC ......... H04B 10/70; H04B 10/11; H04B 10/01
USPC ........................... 398/118–131; 380/255–276
See application file for complete search history.

(56) References Cited

U.S. PATENT DOCUMENTS

| | | | |
|---|---|---|---|
| 6,327,063 B1 * | 12/2001 | Rockwell | 398/122 |
| 2002/0131121 A1 * | 9/2002 | Jeganathan et al. | 359/152 |
| 2006/0018216 A1 * | 1/2006 | Morris et al. | 369/47.1 |
| 2007/0014415 A1 | 1/2007 | Harrison et al. | |
| 2007/0016534 A1 | 1/2007 | Harrison et al. | |
| 2007/0025551 A1 * | 2/2007 | Harrison et al. | 380/256 |
| 2009/0147955 A1 | 6/2009 | Kim et al. | |

FOREIGN PATENT DOCUMENTS

KR    10-20010039162    5/2001

* cited by examiner

*Primary Examiner* — Li Liu (57) ABSTRACT

A handheld device includes: a transmitter or receiver of a signal beam for quantum key distribution; and a source of alignment beams that diverge from each other in a pattern that matches sensors on a station containing a receiver or transmitter for the quantum key distribution. The alignment beams from the handheld device are of sufficient intensity to produce on the station visible spots that facilitate manual alignment of the handheld device. The station can measure a position and a direction of respective alignment beams and dynamically steer the signal beam according to the measurements.

18 Claims, 4 Drawing Sheets

PHOTONIC QUANTUM SYSTEM ALIGNMENT USING MULTIPLE BEAMS

BACKGROUND

The properties of photons make them useful in quantum information systems. In particular, photons are easily generated, can be manipulated using well known and inexpensive optical elements, and have quantum states that can maintain coherence during transmissions over large distances. Accordingly, photon states have been employed for communications in many quantum information systems.

Quantum key distribution (QKD) systems are one type of quantum system that can use photon states, and one example of a QKD system uses the well known BB84 process. With the BB84 process, a sending party generates a set a of random bits $a_i$ and represents the bits $a_i$ using respective photon states (e.g., single-photon states) having polarization encoding based on one of two pairs of orthogonal polarization axes. Conventionally, these two pairs of polarization axes are offset by 45° relative to each other and are respectively referred to as vertical/horizontal and diagonal/anti-diagonal axes. The sending party also generates a second set b of random bits $b_i$ that determine whether respective bits $a_i$ are represented using photon states with vertical/horizontal or diagonal/anti-diagonal polarization encoding. The receiving party measures the polarization of each photon state corresponding to each bit $a_i$, and for each measurement uses a detector that distinguishes between horizontal and vertical polarizations or a detector that distinguishes between horizontal and vertical polarizations. The detector that the receiver uses for measuring a photon state corresponding to bit $a_i$ depends on a corresponding random bit $b_i'$ from a set b' that the receiving party generates. On average, about half of the bits $b_i$ that the sending party used to select the polarization encoding will match the corresponding bits $b_i'$ that the receiving party used for polarization measurement. After the measurements, the sending and receiving parties can exchange sets b and b', and the parties can separately identify a subset a' of set a for which the sending and receiving parties happened to used the same polarization bases. Eavesdropping and error rates can be detected by exchanging a portion of the set a' between the sending and the receiving parties. The remaining portion of set a' is shared random data that can be kept secret and used as classical encryption keys or for other secure communications purposes. The BB84 process has a high probability of detecting any eavesdroppers, so that if no eavesdroppers are detected, the parties can have a high degree of confidence that the shared random data is secret.

Quantum information systems such as QKD systems using photonic signals must be aligned. In particular, the transmitted photonic signal can be very weak, e.g., a series of single photon states, so the position of the transmitted beam must be precisely aligned with a receiver. Additionally, where polarization encoding is employed, as in a typical application of the BB84 QKD process, the polarization axes of the transmitter and the polarization axes of the detector or detectors in the receiver must be precisely aligned to avoid unacceptable error rates in the polarization measurements. Alignment can be more difficult in some quantum information systems in which at least one of the parties is mobile, in which case, a transmitter and a receiver must be precisely aligned for signal beam position, direction, and orientation when the transmitter and receiver are brought into proximity.

BRIEF DESCRIPTION OF THE DRAWINGS

Use of the same reference symbols in different figures indicates similar or identical items.

DETAILED DESCRIPTION

In accordance with an aspect of the invention, a system and process for aligning a signal beam of a quantum information system such as a Quantum Key Distribution (QKD) system employs multiple alignment beams that one party projects onto respective sensors of a second party. Rough alignment is achieved when the beams all hit separated target areas of the sensors. Additionally, the detectors respectively measure different properties of their respective alignment beams. For example, one or more detectors may measure the directions of their respective alignment beams, while one or more additional detectors measure positions of their alignment beams. From the measurements, a control system can infer the position and direction of the signal beam and operate a dynamic steering system so that the signal beam is efficiently coupled into a receiver. As a result, a system including a mobile or handheld transmitter or receiver can effectively align a weak beam of photons.

In accordance with a further aspect of the invention, the alignment beams may diverge from each other so that that the separation or distance between the transmitter and receiver is coarsely fixed when the alignment beams are all incident on their respective target. The separation can also be determined more precisely using the measurements from the sensors, and a dynamic optical system may be able to adjust an optical path length between the transmitter and receiver.

In one specific embodiment, an alignment system employs three or four alignment beams. One alignment beam is incident on a direction sensor that coarsely measures a direction of the alignment beam. One or two other alignment beams are incident on direction sensors that perform finer measurements of beam directions or angular components of beam directions. The direction sensor or sensors that perform fine direction measurements can be adjusted according to the coarse direction measurement. A final alignment beam is incident on a detector that measures the position of the beam. The position and orientation of a signal beam, which is fixed relative to the alignment beams, can be determined from the alignment beam measurements, and receiver or transmitter systems can be dynamically adapted to handle the signal beam.

Figure 1:
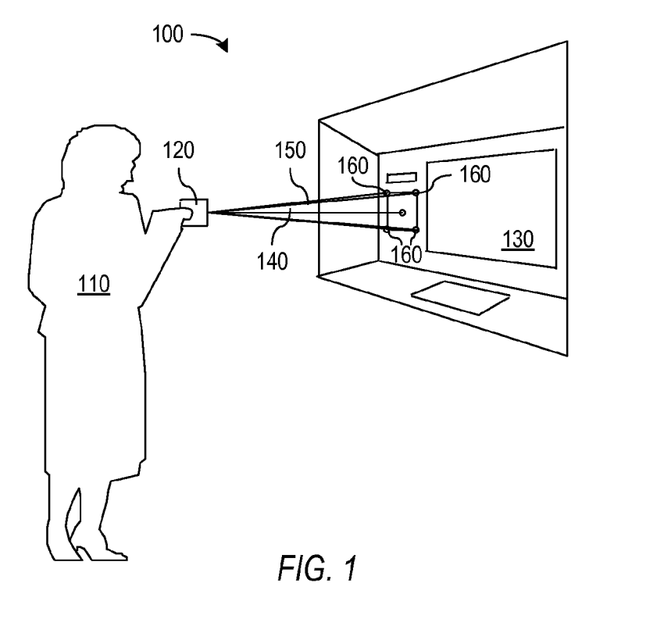
FIG. 1 shows a user with a handheld device employing an alignment system in accordance with an embodiment of the invention.

FIG. 1 illustrates system 100 in accordance with an embodiment of the invention in which a user 110 is in possession of a handheld device 120 communicates with a fixed device or station 130 such as an automated teller machine (ATM), a security checkpoint, or a secure information access point. Handheld device 120 may be either a transmitter or a receiver of a weak photon beam 140, which may, for example, be a series of single-photon states employed in a QKD process. Station 130 includes a receiver or transmitter that is complementary to the transmitter or receiver in device 120. In some cases similar to that depicted in FIG. 1, where a portable device 120 is intended to cooperate with fixed station 130, quantum signal alignment (i.e., alignment of a signal beam 140) could be achieved using a cradle or similar physical structure on station 130. The desired alignment between device 120 and station 130 would then be achieved when device 120 is correctly seated in the cradle. However, instead of using a cradle to hold device 120 with a fixed orientation relative to station 130, system 100 allows user 110 to hold device 120 while an active alignment system adjusts to the position and orientation of device 120. This also allows device 120 to have non-standard shapes that may not be accommodated by a given cradle on station 130. Accommodating a handheld device 120 that does not need to be brought into physical contact with station 130 may also make transactions easier and faster to execute.

Device 120, in general, may be a personal digital assistant (PDA), a telephone, a portable computer, a specialized device solely for use with station 130 or similar stations, or any other type of device containing the necessary components for transmission or receipt of a weak photonic signal beam 140. In the embodiment of FIG. 1, handheld device 120 transmits multiple alignment beams 150 that are incident on spatially-separated sensors 160 on station 130. Alignment beams 150 are preferably of sufficient intensity to create visible spots of illumination on sensors 160, so that user 110 can see when handheld device 120 is aligned (at least roughly) for communication with station 130. In an alternative configuration, station 130 may generate alignment beams that are projected onto sensors on handheld device 120. However, this alternative configuration is believed to be less user-friendly.

In one specific embodiment, device 120 contains a QKD transmitter system, which interfaces with a QKD receiver system in station 130. The QKD transmitter and QKD receiver enable user 110 and station 130 to establish a shared secret key, which can be used to encrypt transaction messages passed between them, for example, over the classical communication channel. The classical communication channel may be a separate wireless channel (not illustrated) or may be conveyed through one or more of alignment beams 140.

Figure 2:
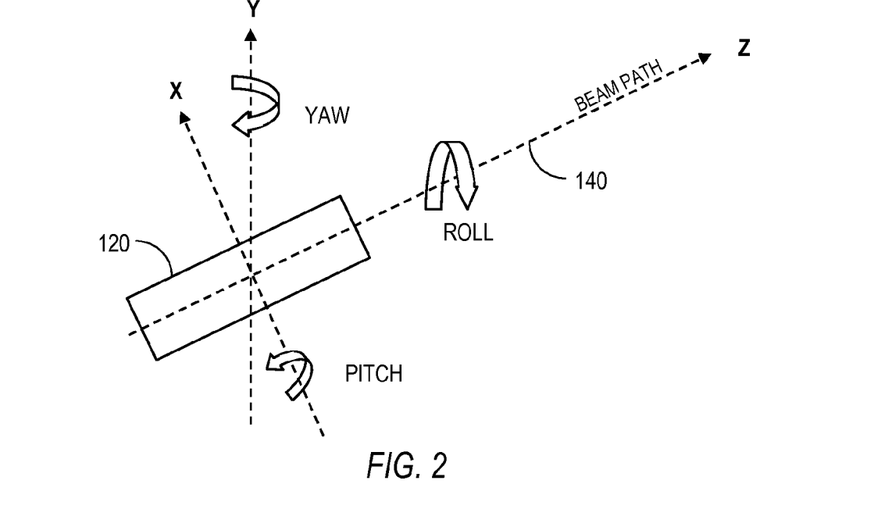
FIG. 2 illustrates degrees of freedom of a handheld device that can be controlled or compensated for using an alignment system in accordance with an embodiment of the invention.

The alignment process in system 100 generally must be able to determine and adjust to the position and orientation of device 120 relative to station 130. FIG. 2 illustrates a target path for signal beam 140 from device 120 when device 120 acts as a transmitter. As a convention used herein, the Z axis is defined to correspond to the optical axis of the target receiver, and FIG. 2 shows signal 140 as propagating on the ideal path along the Z axis. However, device 120 is free to move along three axes X, Y, and Z and free to rotate about the axes X, Y, and Z for pitch, yaw, and roll rotations. Movement along the X or Y axis or pitch or yaw rotations will move or skew beam 140 away from the target path, which can cause loss of signal. Roll rotation changes the relative directions of polarizations of the signal beam, which can cause errors when polarizations are measured in station 130. Movement along the Z axis is generally less critical but may affect the strength of signal 140 at the receiver. In accordance with an aspect of the current invention, an alignment system uses the measurements from position and direction sensors that measure the alignment beams to permit determination of the position or orientation of device 120 in all of its degrees of freedom, so that an active optical system can dynamically steer signal beam 140.

Figure 3:
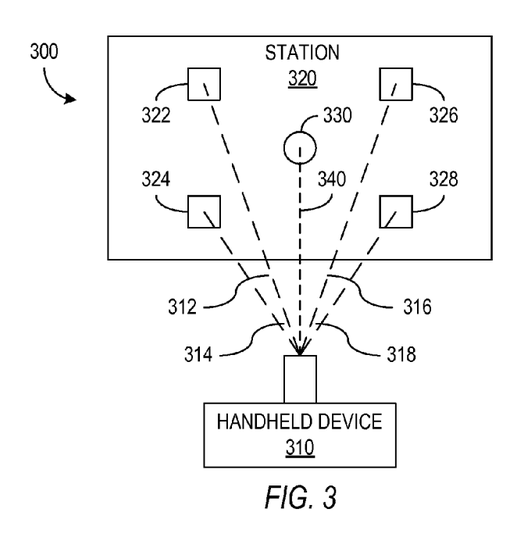
FIG. 3 shows a handheld device directing multiple alignment beams at sensors used in an alignment system in accordance with an embodiment of the invention.
Figure 4:
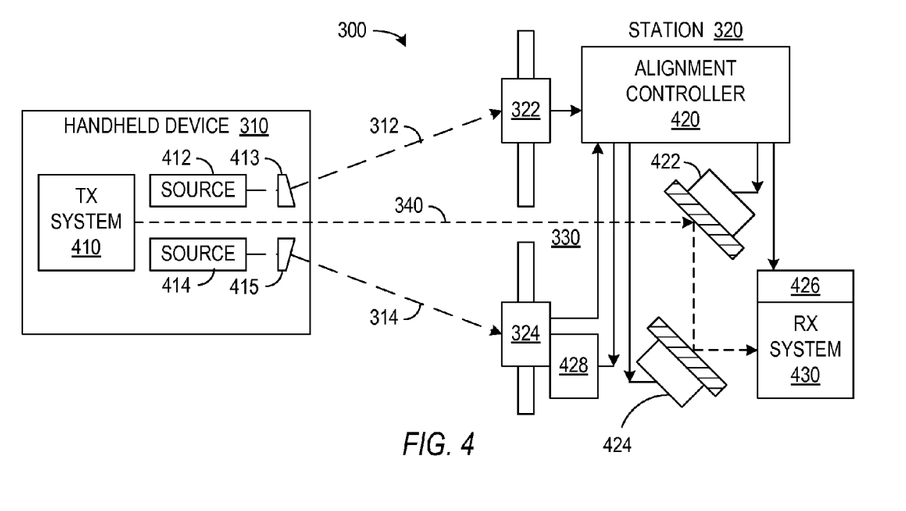
FIG. 4 illustrates a system with a receiver in accordance with an embodiment of the invention using tilt mirrors to control the position and orientation of a signal beam.

FIGS. 3 and 4 are views of a QKD system 300 in which a handheld device 310 emits divergent alignment beams 312, 314, 316, and 318. FIG. 3 illustrates how beams 312, 314, 316, and 318 can form a 2×2 pattern of spots respectively on four sensors 322, 324, 326, and 328 on a QKD station 320. The pattern of beams 312, 314, 315, and 318 can be generated using four individual light sources, e.g., separate lasers, or with the use of a single light source with optics that split a single beam into four alignment beams 312, 314, 315, and 318. FIG. 4 illustrates the example of separate sources 412 and 414 with beam optics 413 and 415 that direct beams 312 and 314 so that beams 312 and 314 diverge from each other and propagate at precisely controlled angles relative to a signal beam 340. In the embodiment of FIG. 4, handheld device 310 contains a transmitter 410 that produces a signal beam 340 (e.g., a stream of single photon states) that is much weaker in intensity than are alignment beams 312, 314, 316, and 318. Alternatively, handheld device 310 can contain a receiver of signal beam 340, and station 320 can contain the transmitter that produces signal beam 340. In either case, alignment beams 312, 314, 316, and 318 are preferably of a different wavelength to that of a signal beam 340 to minimize signal noise. Alignment beams 312, 314, 315, and 318 may similarly be of different wavelengths from each other to reduce noise in alignment measurements.

A user, as described above, is required to position handheld device 310 such that the four visible spots caused by incidence of alignment beams 312, 314, 315, and 318 on QKD station 320 sit within the target areas of sensors 322, 324, 326, and 328. The target areas would generally be marked or delineated in a manner that the user can see, so that the user can identify when alignment beams 312, 314, 315, and 318 are incident on the appropriate target areas. Based on triangulation principles, the known relative divergence of alignment beams 312, 314, 315, and 318 and the known pattern and separations of sensors 322, 324, 326, and 328 dictate the approximate distance between handheld device 310 and station 320 when the alignment beams are incident on the target areas. The pattern of sensors 322, 324, 326, and 328 also confines the pitch, yaw, and roll angles at which handheld device 310 can be held relative to station 320 and still have beams 312, 314, 315, and 318 hit the target sensors. The 2×2 pattern of FIG. 3 permits coarse alignment (e.g., where spots are on target areas of sensors 322, 324, 326, and 328) at roll angles that are 90° apart. This rotational invariance can be avoided if desired using a less symmetric pattern for sensors 322, 324, 326, and 328, e.g., by moving one of more of the sensors closer or further from the center of the pattern, and changing the beam pattern in a matching fashion.

When visually aligned for incidence on sensors 322, 324, 326, and 328, alignment beams 312, 314, 315, and 318 will have respective directions that are roughly known. However, the manual positioning handheld device 310 using sight to position the beam spots on target areas will still permit variation in the positions and directions of alignment beams 312, 314, 315, and 318 and signal beam 340. These variations may be too large for reliable signal measurements with a low error rate. Accordingly, sensors 322, 324, 326, and 328 measure directions and positions of alignment beams 312, 314, 315, and 318 so that an alignment controller 420 can determine how to operate active steering systems (e.g., tip-tilt mirrors 422 and 424 and a roll steering system 426) so that signal beam 340 is precisely aligned with an optical axis of receiver 430 and has polarization axes precisely aligned with the measurement axes of receiver 430.

In an exemplary embodiment, three sensors 322, 324, and 326 are direction or angle sensors and one sensor 328 is a beam-position sensor. Three directions sensors 322, 324, and 326 are used in the exemplary embodiment to provide measurements over a wide range of angles and also provide measurements with the precision required for control of signal beam 340. More specifically, one sensor 322 can be used for coarse angle or direction measurement within a wide range of measurements. Two sensors 324 and 326 can perform fine resolution measurements of component angles corresponding to rotations about respective perpendicular axes, e.g., measurements of pitch and yaw rotations of handheld device 310 respectively about the X and Y axes in FIG. 2. The two fine resolution sensors 324 and 326 can have adjustable mounting systems 428 that tip or tilt the respective sensors 324 or 326 by angles that depend on the measurement by direction sensor 322.

Figure 5:
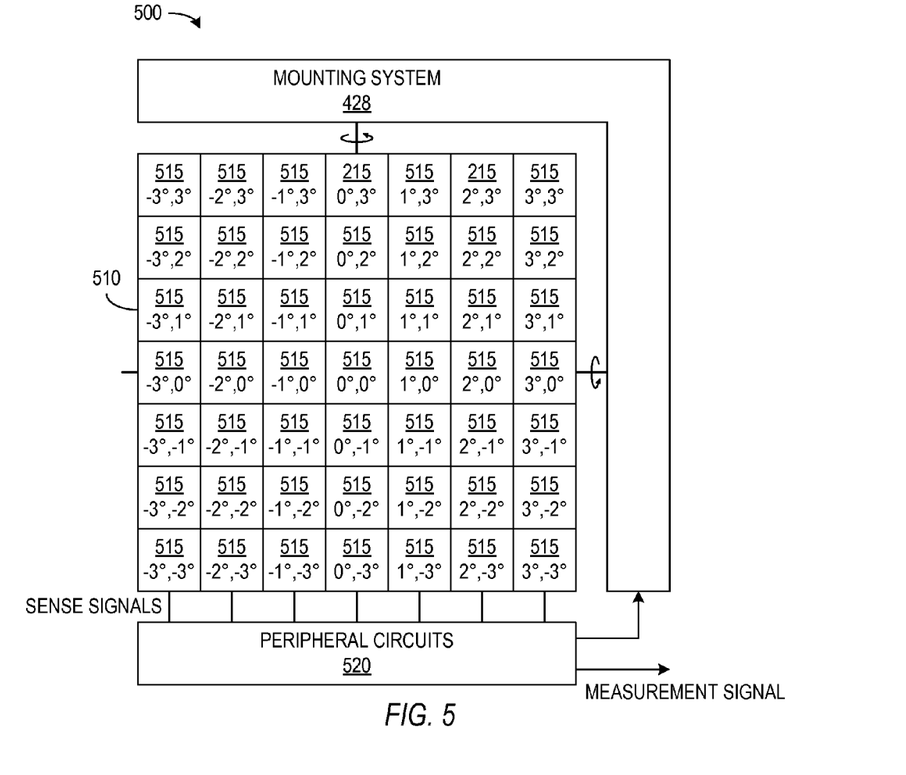
FIG. 5 shows a plan view of a beam direction sensor suitable for the systems of FIGS. 3 and 4.

FIG. 5 illustrates an example of a direction sensor 500 suitable for use in alignment system 300. Sensor 500 includes an array 510 of sensor cells 515. Each sensor cell 515 is a directional detector that detects photons of a given wavelength if the photons are incident at a specific direction, but sensor cells 515 respectively detect photons with different incident directions. Array 510 can be integrated on an integrated circuit chip, so that the size of array 510 is smaller than the area of the illuminated beam spot on sensor array 510. During a measurement, all of sensor cells 515 can be simultaneously illuminated by an alignment beam to be measured, and the direction of the alignment beam is indicated by which sensor cell or cells 515 detect photons. In general, the area of the target area for an alignment beam and the beam profile can be selected so that a beam incident within the target area automatically covers an entire sensor array 510, and if necessary, multiple sensor arrays 510 can be used to cover larger target areas.

Figure 6:
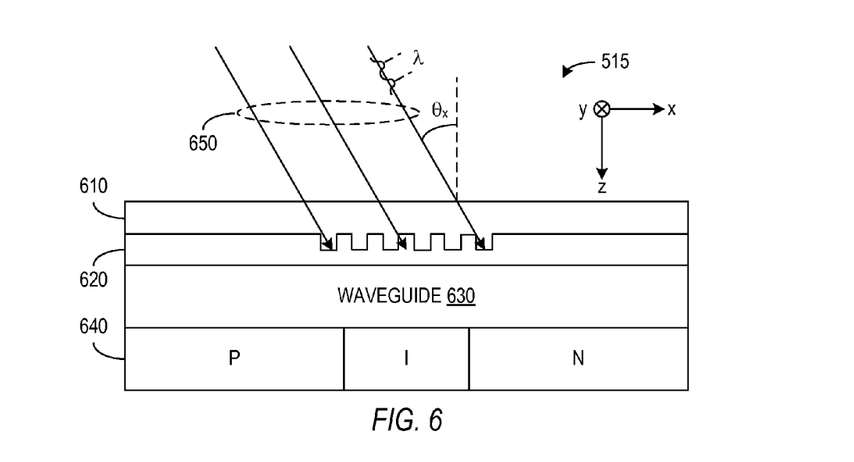
FIG. 6 is a cross-sectional view of a directional detector of the beam direction sensor of FIG. 5.

FIG. 6 illustrates an embodiment of a sensor cell 515 that uses guided-mode resonance (GMR) filtering to achieve directional detection. Sensor cell 515 includes a cover layer 610, a grating layer 620, a waveguide layer 630 underlying grating layer 620, and a photodiode layer 640 underlying waveguide layer 630. The order of arrangement of layers 610, 620, 630, and 640 in FIG. 6 illustrates an example arrangement but alternative arrangements are possible.

Cover layer 110 is a protective layer and can be made of a material such as silicon dioxide but may additionally include an antireflective coating to prevent reflection at a top surface of detector 515, a band-pass optical filter to select the wavelength of light reaching grating layer 630, or any other optical coating. Alternatively, cover 610 can be omitted, making grating layer 620 the top layer of detector 515.

Grating layer 620 is made of a material having a refractive index that is higher than the refractive index of cover layer 610. Grating layer 620 may, for example, be made of silicon nitride when cover layer 610 is made of silicon dioxide or is omitted. Grating layer 620 has a pattern that creates a resonance that strongly couples incident light 650 into waveguide 630 only if the wavelength λ and direction of incident light 650 satisfy specific conditions. In particular, with the wavelength of an alignment beam being known and fixed, grating layer 620 can be patterned so that resonant coupling only occurs if the incident alignment beam has (or is close to) a specific incident direction. The specific design of grating layer 130 will depend on the wavelength λ and incident direction of light to be detected and may be produced using GMR filter design techniques that are known in the art.

Waveguide layer 620 contains a core that is intended to guide light of a specific frequency or wavelength λ that sensor cell 515 measures. In particular, if the wavelength λ of the light guided is in the infrared range, waveguide layer 620 may contain a core made of silicon or another material that is transparent to infrared light and cladding of a material such as silicon dioxide or silicon nitride that has a lower refractive index than does the core material. For visible light, the core in waveguide layer 620 may be made of silicon nitride and have cladding of silicon dioxide. However, waveguides are well known structures, and waveguide layer 620 could alternatively contain many other types of waveguide structures and materials, which are known or may be developed.

Photodiode layer 640 contains a sensor that is positioned to measure light that is coupled into the core of waveguide layer 620. In the illustrated embodiment, photodiode layer 640 contains a horizontal p-i-n photodiode, but the illustrated photodiode can be replaced by any device capable of measuring the presence or more preferably the intensity of light in waveguide layer 620. However, photodiode layer 640 will only detect light and generate a strong electrical signal if incident light 650 has the proper wavelength and direction for resonant coupling into waveguide layer 620.

FIG. 5 shows the examples where each sensor cell 515 has a resonant coupling for light incident from a different direction, i.e., a different combination of pitch and yaw angles $\theta_x$ and $\theta_y$. For example, in FIG. 5, columns of sensor cells 515 in array 510 cover a range of values for projection angle $\theta_x$ from −3° to 3° in steps of 1° for a specified incident wavelength, and rows of sensor cells 515 in array 510 cover a range of values for projection angle $\theta_y$ from −3° to 3° in steps of 1° for the specified incident wavelength. When an incident beam of the selected wavelength simultaneously illuminates all sensor cells 515, the photodiode in a sensor cell 515 that contains a grating pattern corresponding to a direction closest to the direction of the incident beam will measure the most light.

Peripheral circuits 520, which are coupled to sensor cells 515, can detect which sensor cell or cells 515 sense light and based on the sense signals from sensor cells 515 produce a measurement signal indicating the direction of the light incident on array 510. In one embodiment, the resolution of each sensor cell 515 is such that in many cases only one sensor cell 515 will detect a light and produce a sense signal with an output voltage or current above a threshold or noise level when the incident beam direction is within the measurement range that sensor array 510 provides. When only one detector 515 produces a sense signal above the threshold level, the measured direction of the incident light beam relative to the normal of sensor array 510 will be the direction corresponding to the resonance of the sensor cell 515 producing the sense signal, and peripheral circuits 520 can include a decoder circuit that generates a measurement signal representing the direction corresponding to the sensor cell 515 at resonance. However, in some cases, e.g., when the incident direction is near halfway between the resonance directions of two or more sensor cells 515, multiple sensor cells 515 may produce sense signals above the threshold level. In such cases, peripheral circuits 520 can identify which sensor cell 515 produces the strongest sense signal and generate a measurement signal corresponding to the resonant direction of the detector 515 producing the strongest sense signal. Alternatively, when multiple sensor cells 515 produce sense signals above a noise level, peripheral circuits 520 can use the sense signals from detectors 515 in an interpolation process that determines a measured direction and the measurement signal.

FIG. 5 illustrates a configuration that measures angles about two perpendicular axes, e.g., pitch and yaw angles, with a range centered on normal incidence. The orientation of such sensor array 510 can be set so that the alignment beam to be measured is nominally normal to the surface of array 510, e.g., direction sensor 322 can be titled at a fixed angle relative to the surface of station 320 in system 300 of FIG. 3. As described above, the coarse angle sensor 322 measures two angles and requires a wide measurement range. Alternatively, for use in sensors 324 or 326, sensor cells 515 can be designed to measure incidence angles corresponding to rotations of handheld device 310 about a single axis, e.g., pitch or yaw rotations, and the different resonances of sensor cells 515 can be made sharp and closely spaced for fine measurements.

FIG. 5 also illustrates how the range of angle measurements provided by system 500 can be effectively expanded beyond the range of array 510 using a mounting system 428 capable of tilting array 510. Mounting system 428 may, for example, include three actuators (not shown) on which array 510 rests. The lengths of the actuators can then be electrically changed to tilt array 510 in range of directions that depends on the range of motion of the actuators. As described above, alignment controller 420 can set the mounting systems 428 of sensors 324 and 326 according to the measured direction provided by sensor 322 and the expected directions of alignment beams 314 and 316 relative to alignment beam 312 so that the respective alignment beams 314 and 316 have directions within the measurement ranges of sensors 324 and 326.

Direction sensors 322, 324, and 326 can thus be implemented using the compact structure of sensor 500 of FIG. 5. However, other types of direction sensors could be employed, and if one or two directional sensors can provide both the desired measurement range and precision, one or two alignment beams would be sufficient for direction measurements.

The final sensor 328 in FIG. 3 is a position sensing detector (PSD) such as those manufactured by SiTek Electro-Optics of Sweden. These PSDs can provide a measurement of X and Y deviations from a reference line with micrometer resolution. Other combinations of PSDs and angular sensors are possible rather than the example of three angular sensors and one PSD.

Controlling handheld device 310 so that alignment beams 312, 314, 316, and 318 illuminate spots within all delineated target areas guarantees that signal beam 340 will pass through a central aperture 330 of suitable size on station 320. However, as mentioned above, visual alignment may still not align beam 340 with sufficient accuracy for low error rate measurements. Accordingly, alignment controller 420 operates an active system to dynamically steer beam 340 relative to a receiver 430. In the illustrated embodiment of FIG. 4, a first tip-tilt mirror 422 has two adjustable angles and directs signal beam 340 onto the centre part of a second tip-tilt mirror 424. Tip-tilt mirror 424 also has two adjustable angles and sufficient precision for fine adjustment of the pitch and yaw of signal beam 340 (not translation) in order for signal beam 340 to enter receiver 430. Alignment control system 420 can then use detector steering system 426 to rotate detection axes in receiver 430 to compensate for the roll angle of handheld device 310 and match the detector axes to the polarization axes of signal beam 340. Alternatively, an active optical element could be used to adjust the roll angle of beam 340, but minimizing the number of optical elements interacting with signal beam 340 may be preferred. In yet another embodiment, one or both of tip-tilt mirrors 42 and 424 could be eliminated if detector steering system 426 is able to move receiver 430 as needed to accommodate the determined position and orientation of signal beam 340.

Alignment controller 420, which may include a computing system with suitable software or firmware, requires both the position measurement from PSD 328 and the direction measurements from angular sensors 322, 324, and 326 to accurately place signal beam 340 relative to detector 430 and to select the measurement axes. More specifically, signal beam 340 has known angular separations from each alignment beam 312, 314, 316, and 318, respectively. Given that the beam directions and locations of alignment beams 312, 314, 316, and 318 and signal beam 340 at handheld device 310 are known, e.g., fixed by a standard or convention, measurements of the direction (two angles) of one or two alignment beams and the position of one alignment beam at the known locations of sensors 322, 324, 326, and 328 is sufficient to geometrically determine the position and orientation of signal beam 340 traversing the space between handheld device 310 and station 320. The steering mechanism including tip-tilt mirrors 422 and 424 and detector steering system 426 can be adjusted to accommodate signal beam 340. Alternatively, transmitter 410 or associated optics (not shown) could be adjusted to realign signal beam 340.

System 300 permits handheld device 310 to have only passive, inexpensive components, which is important because handheld device 310 will typically be of limited size and power. System 300 has the further advantage of giving visible user feedback which has been shown to reduce hand jitter and therefore simplify the alignment procedure. Yet another advantage of system 300 is the relatively small amount of optics required to be in the path of the signal beam for alignment purposes. Since the signal beam may contain single photons orientated in four different polarizations, minimizing loss and maintaining polarization fidelity is important.

Figure 7A:
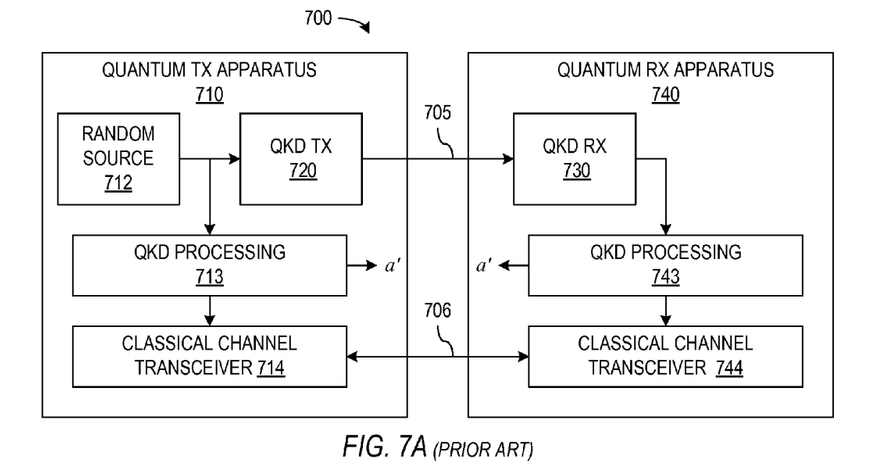
FIGS. 7A, 7B, and 7C respectively illustrate a QKD system, a QKD transmitter, and a QKD receiver.
Figure 7B:
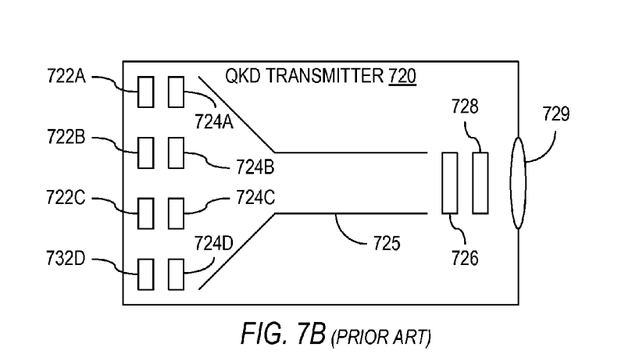
Figure 7C:
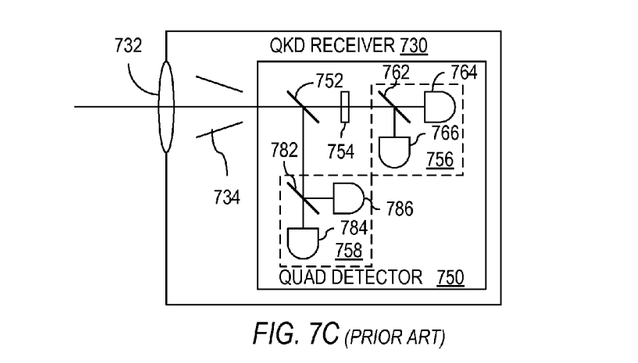

A significant application of the alignment systems described above is for a QKD system in which handheld device 310 includes a transmitter apparatus (e.g., TX system 410) or a receiver apparatus (e.g., RX system 430) and station 320 includes a complementary receiver or transmitter apparatus. FIGS. 7A, 7B, and 7C illustrate a typical embodiment of a QKD system in which the above alignment systems may be employed. In particular, FIG. 7A illustrates a QKD system 700 including a QKD transmitting apparatus 710 using a QKD transmitter 720 to send a random data set provided by a random source 712, over a quantum signal channel 705 to a QKD receiver 730 of a QKD receiving apparatus 740. The signal beam transmitted on quantum signal channel 705 may be a stream of randomly polarized photons. QKD transmitting and receiving apparatuses 710 and 740 then respectively process the data transmitted and received in respective processing systems 713 and 743 to derive a common subset a' of the initial random data set a. The well-known BB84 quantum coding scheme can be used in this process. As the quantum signal channel 705 can be noisy, the processing of the data received over channel 705 generally includes an error correction phase that relies on messages exchanged over a classical channel 706 established between classical channel transceivers 714 and 744 of the transmitting and receiving apparatuses 710 and 740, respectively.

In system 700, QKD transmitter 720 generally includes optical components for selectively polarizing photons, and QKD receiver 730 includes optical components for receiving photons and detecting their polarization. Typically, these optical components establish two pairs of orthogonal polarization axes, the two pairs of polarization axes being offset by 45° relative to each other, e.g., vertical/horizontal and diagonal/anti-diagonal axes. For proper operation of QKD system 700, QKD transmitter 720 and QKD receiver 730 must be aligned so that apparatus 740 receives the signal beam on channel 705 from apparatus 710 and apparatus 710 and apparatus 740 agree regarding the directions of the vertical/horizontal and diagonal/anti-diagonal polarization axes.

QKD transmitter 720 as illustrated in FIG. 7B includes an array of light sources such as light emitting diodes (LEDs) 722A, 722B, 722C, and 722D, and in front of LEDs 722A, 722B, 722C, and 722D are respective polarizing filters 724A, 724B, 724C, and 724D. Filter 724A polarizes photons emitted from LED 722A vertically, filter 724B polarizes photons emitted from LED 722B horizontally, filter 724C polarizes photons emitted from LED 722C diagonally, and filter 724D polarizes photons emitted from LED 722D anti-diagonally. Thus, each photon in the stream of photons coming away from filters 724A, 724B, 724C, and 724D is linearly polarized in one of four directions, these directions corresponding to two pairs of orthogonal polarization axes at 45° relative to each other. A fiber optic light guide 725 conveys the polarized photons out through a lens 729 via a narrow band pass frequency filter 726 (for restricting the emitted photons to a narrow frequency range, typically plus or minus 1 nm), and a spatial filter 728 (for limiting light leakage outside the channel). An attenuation arrangement, not specifically illustrated, may also be provided to reduce the number of photons emitted; the attenuation arrangement may simply be an attenuating filter placed near filters 726 or 728 or may take the form of individual power control circuits for regulating the power fed to each of LEDs 722A, 722B, 722C, and 722D when pulsed. Without the attenuation arrangement the number of photons emitted each time a LED 722A, 722B, 722C, or 722D is pulsed at normal levels would, for example, be of the order of one million; with the attenuation arrangement in place, the average emission rate can be 1 photon per 10 pulses. Importantly this means that more than one photon is rarely emitted per pulse.

FIG. 7C shows a QKD receiver 730 including a lens 732, a quad-detector arrangement 750, and a fiber optic light guide 734 for conveying photons received through the lens 732 to quad-detector arrangement 750. Quad-detector arrangement 750 includes a beam splitter 752, a half-wave plate 754 for rotating the polarization of photons by 45°, a first paired-detector unit 756, and a second paired-detector unit 758. Beam splitter 752 as depicted in FIG. 7C can be half-silvered mirror but can alternatively be of other forms such as diffraction gratings. The first paired-detector unit 756 includes a polarization-dependent beam splitter 762 and detectors 764 and 766, and beam splitter 762, which may be a birefringent beam splitter, causes the polarizations detected by the detectors 764 and 766 to be mutually orthogonal. The second paired-detector unit 758 includes a polarization-dependent beam splitter 782 and detectors 784 and 786, and beam splitter 782, which may be a birefringent beam splitter, causes the polarizations detected by detectors 784 and 786 to be mutually orthogonal. The polarization rotation caused by half-wave plate 754 causes the polarizations detected by detectors 764 and 756 to be at 45° relative to the polarizations detected by detectors 784 and 786. More specifically, paired detector unit 758 is arranged to detect horizontal/vertical polarizations, whereas paired detector unit 756 is arranged to detect diagonal/anti-diagonal polarizations.

Although the invention has been described with reference to particular embodiments, the description is only an example of the invention's application and should not be taken as a limitation. For example, although the above embodiments are primarily described with reference to a QKD system, the alignment capabilities are also desirable for use in the embodiments of the invention that use a weak photonic signal beams for other purposes. Further, although some embodiments are described for a situation where one device is mobile or handheld and the other device is stationary or securely mounted, principles of such embodiments could be employed in situations where both the transmitter and the receiver are handheld or mobile. Various other adaptations and combinations of features of the embodiments disclosed are within the scope of the invention as defined by the following claims.

What is claimed is:

1. A handheld device comprising:
 a first device for quantum key distribution; and
 a source of a plurality of alignment beams that diverge from each other in a pattern that matches sensors on a station containing a second device that is configured to communicate with the first device through a signal beam for the quantum key distribution, wherein the alignment beams from the handheld device are of sufficient intensity to produce on the station visible spots that facilitate manual alignment of the handheld device.

2. The device of claim 1, wherein the signal beam represents information using polarizations having axes defined relative to the pattern of the alignment beams.

3. The device of claim 1, wherein the first device comprises a transmitter of the signal beam and the second device comprises a receiver of the signal beam.

4. The device of claim 1, wherein the first device comprises a receiver of the signal beam and the second device comprises a transmitter of the signal beam.

5. A system comprising:
 a steering mechanism;
 a first direction sensor positioned to receive a first alignment beam and measure a direction of incidence of the first alignment beam;
 a position sensor positioned to receive a second alignment beam; and
 a controller coupled to receive and process measurements from the direction sensor and the position sensor and to operate the steering mechanism to control in accordance with the measurements, a path of a signal beam relative to a receiver.

6. The system of claim 5, wherein the system uses the signal beam for a quantum key distribution process.

7. The system of claim 5, wherein the steering mechanism comprises:
 a first tip-tilt mirror positioned to receive the signal beam;
 a second tip-tilt mirror, wherein the controller operates the first tip-tilt mirror to direct the signal beam at the second tip-tilt mirror; and
 a detector control system that the controller operates to align polarization axes of the signal beam and polarization axes of the receiver.

8. The system of claim 5, further comprising a second direction sensor positioned to receive a third alignment beam, wherein the second direction sensor measures beam direction with a finer resolution than does the first direction sensor.

9. The system of claim 8, wherein the first direction sensor measures a first direction of the first alignment beam, and the controller adjusts the second direction sensor in accordance with the first direction to enable the second sensor to measure a direction of the third alignment beam.

10. The system of claim 5, wherein the first alignment beam and the second alignment beam diverge from each other.

11. The system of claim 5, wherein:
 the steering system, the first direction sensor, the position sensor, and the controller are components of a fixed station; and
 the system further comprises a handheld device that includes a source of a plurality of alignment beams that diverge from each other in a pattern that matches a pattern of sensors on the station.

12. The system of claim 11, wherein the alignment beams from the handheld device are of sufficient intensity to produce on the station visible spots that facilitate manual alignment of the handheld device.

13. The device of claim 5, wherein the first direction sensor identifies an angle between the first incident direction and a normal to a surface of the first direction sensor.

14. A process comprising:
generating a plurality of alignment beams that traverse a space between a first device and a second device;
manually positioning the first device so that the plurality of alignment beams respectively are incident on a plurality of sensors, wherein the sensors are on one of the first device and the second device and are separated to form a pattern adjacent to a path of a signal beam that traverses the space between the first device and the second device;
measuring a direction of incidence of one or more of the alignment beams at the respective sensors;
measuring a position of one or more of the alignment beams at the respective sensors; and
operating a steering mechanism according to the direction and the position measured so that the signal beam is aligned with a receiver in one of the first device and the second device.

15. The process of claim 14, further comprising employing the signal beam for quantum key distribution between the first device and the second device.

16. The process of claim 14, wherein:
the first device is a handheld device and generates the alignment beams; and
the second device is a fixed station that operates the steering mechanism.

17. The process of claim 14, wherein generating the plurality of alignment beams comprises directing the alignment beams so that the alignment beams diverge from each other.

18. The process of claim 14, wherein manually positioning the first device comprises a user holding the first device so that the alignment beams form visible spots on target areas of the sensors.

* * * * *